(12) United States Patent
Rowe et al.

(10) Patent No.: US 6,575,615 B2
(45) Date of Patent: Jun. 10, 2003

(54) LIVESTOCK MIXER AND FEEDER

(76) Inventors: Daniel L. Rowe, 416 S. Fifth St., Thermopolis, WY (US) 82443; William C. Schrage, 620 E. Sunnyside La., Thermopolis, WY (US) 82443

(*) Notice: Subject to any disclaimer, the term of this patent is extended or adjusted under 35 U.S.C. 154(b) by 6 days.

(21) Appl. No.: 09/924,650

(22) Filed: Aug. 8, 2001

(65) Prior Publication Data

US 2003/0035340 A1 Feb. 20, 2003

(51) Int. Cl.[7] .................................................. B01F 7/24
(52) U.S. Cl. ..................... 366/156.1; 366/186; 366/266; 366/602; 241/101.761
(58) Field of Search ................. 366/156.1, 186, 366/603, 266; 241/101.71, 101.75, 101.761

(56) References Cited

U.S. PATENT DOCUMENTS

| | | | | | |
|---|---|---|---|---|---|
| 1,707,999 A | * | 4/1929 | Snyder | ................. | 366/266 |
| 2,800,238 A | * | 7/1957 | Kanengieter et al. | ....... | 366/266 |
| 2,815,941 A | * | 12/1957 | Schmale | ................. | 366/266 |
| 2,885,191 A | * | 5/1959 | Oliver | ................. | 366/603 |
| 2,894,733 A | * | 7/1959 | Wosmek | ................. | 366/266 |
| 2,896,923 A | * | 7/1959 | Luscombe | ................. | 366/186 |
| 3,133,727 A | * | 5/1964 | Luscombe | ................. | 366/186 |
| 3,185,449 A | * | 5/1965 | Kasten | ................. | 366/266 |
| 3,186,689 A | * | 6/1965 | Davies | ................. | 366/266 |
| 3,369,762 A | * | 2/1968 | Buzenberg et al. | ......... | 366/603 |
| 3,589,684 A | * | 6/1971 | Dixon | ................. | 366/266 |
| 3,667,734 A | * | 6/1972 | Skromme et al. | ........... | 366/266 |
| 3,735,932 A | * | 5/1973 | Bradley | ................. | 241/101.8 |
| 3,780,993 A | * | 12/1973 | Kline | ................. | 366/266 |
| 3,840,189 A | * | 10/1974 | Kanengieter et al. | .... | 241/101.8 |
| 3,997,146 A | * | 12/1976 | Kline | ................. | 366/186 |
| 4,026,528 A | * | 5/1977 | Kline et al. | ................. | 366/603 |
| 4,134,690 A | * | 1/1979 | Lindstrom | ................. | 366/266 |
| 4,201,348 A | * | 5/1980 | Bigbee et al. | ............. | 366/603 |
| 4,432,499 A | * | 2/1984 | Henkensiefken et al. | ... | 366/186 |

* cited by examiner

Primary Examiner—Tony G. Soohoo
(74) Attorney, Agent, or Firm—John O. Mingle

(57) ABSTRACT

A livestock mixer and feeder apparatus operates efficiently to minimize the time and facilities necessary to service a modest feedlot. The large mixing chamber utilizes a vertical auger operating at high speed to quickly perform the mixing procedure and is run by a high power hydraulic motor. A moveable base, such as a pickup, supplies the need power-take-off capability and produces efficient feedlot operation, since the apparatus can be quickly loaded and unloaded. Prudent sized inlet and outlet augers complete the apparatus and are also powered by hydraulic motors.

13 Claims, 1 Drawing Sheet

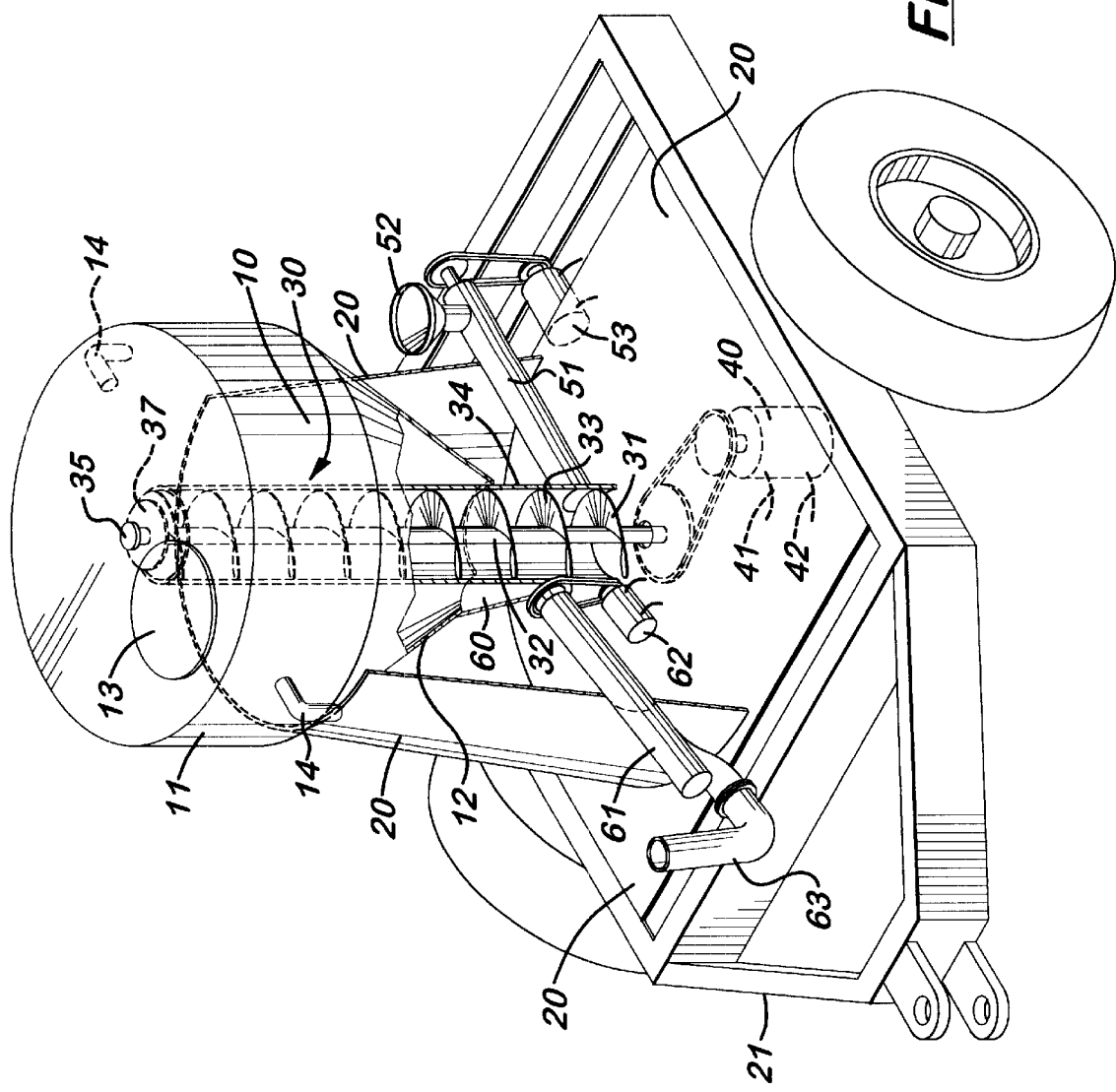

LIVESTOCK MIXER AND FEEDER

BACKGROUND OF INVENTION

1. Field of Invention

The present invention relates to a portable feed mixer designed to utilize modern hydraulic power equipment to efficiently handle a modest sized livestock feedlot.

2. Background

Mixers are a common item. In particular those for use with feedlots are standard items where many livestock must be fed regularly. Generally such feed mixers are situated upon a platform that is pulled by a tractor or other farm vehicle. The power-take-off (PTO) from the tractor powers the mixing apparatus as well as the feed and delivery mechanism. Often the power match between such equipment is poor resulting in considerable inefficiency due to lost time. Further often this arrangement ties up valuable farm equipment since the actual livestock feeding operation represents only a short daytime period, and this is particular true in modest sized feedlots.

The subject invention is designed to overcome these deficiencies by being portable so that it is loaded and unloaded easily upon a moving platform. The best mode is normally a ¾ ton pickup bed where the mixer and feeder only takes a few minutes to position and hook up the power equipment. Thus the pickup is available to further employ for other necessary tasks during other time periods.

The subject invention is designed for mixing a modest amount of grain and its additive supplements. In the best mode this is approximately fifty bushels of grain and supplements; however, the actual volume is depended upon the number of livestock being fed. Smaller amounts, such as half as much, still work well. Larger amounts of mix depend upon the power available from hydraulic motors since the mixing time is in the best mode less than ten minutes. If power available is too small, the result is much longer mixing times as well as feeding times and also slow-ups because of frequent feed jams. The above suggested ¾ ton pickup normally has sufficient PTO capability to power such required hydraulic motors for a modest sized feedlot of several hundred livestock.

Related United States patents include:

| U.S. Pat. No. | Inventor | Year |
| --- | --- | --- |
| 5,863,122 | Tamminga | 1999 |
| 5,601,362 | Schuler | 1997 |
| 5,462,354 | Neier | 1995 |
| 4,437,766 | Joachim | 1984 |
| 4,092,014 | Hughes | 1978 |
| 4,026,528 | Kline et al. | 1977 |

Tamminga discloses a rotatable auger feed mixer with auger ends that are specially designed to mix hay and other feed ingredients by cutting through the hay as the mixture is moved upward.

Schuler discloses a rotatable auger feed mixer with tapered flighting along with grader blades to direct the mixture away from sidewalls.

Neier discloses a rotatable auger feed mixer power by a load sensitive variable speed power transfer mechanism between the tractor power take-off and the mixer auger.

Joachim discloses a rotatable auger feed mixer with special variable pitch augers—one located centrally and the other peripheral.

Hughes discloses a rotatable auger feed mixer with variable flighting and a peripheral location Kline et al. disclose a rotatable auger feed mixer with a uniform central auger and other peripheral augers, wherein the main feeder auger is fed by a hammer mill for chopping the inlet feed.

The subject invention is a rotatable auger feed mixer for use with grain and supplements with easily assembled components and is designed as a portable unit capable of sufficient capacity for moderate sized feedlot usage that utilizes modem technology to obtain high efficiency from a minimum of time and equipment.

SUMMARY OF INVENTION

The objectives of the present invention include overcoming the above-mentioned deficiencies in the prior art by designing a portable feed mixer that allows prudent use of hydraulic power equipment to minimize the time and facilities necessary to service a modest feedlot.

BRIEF DESCRIPTION OF DRAWING

FIG. 1 shows the livestock mixer/feeder with a cutaway of the chamber to indicate the mixing assembly auger particulars.

DETAILED DESCRIPTION OF INVENTION

The subject invention is designed for mixing a modest amount of grain and its additive supplements to feed several hundred livestock in a feedlot setting. In the best mode this is approximately fifty bushels of grain and supplements; however, the actual volume mixed is depended upon the number of livestock being fed. Smaller amounts, such as half as much, still work well. Larger amounts of mix depend upon the power available from hydraulic motors since the mixing time in the best mode is less than ten minutes. If the power available is insufficient, jamming of augers becomes a problem resulting in inefficiency with much longer mixing and feeding times.

FIG. 1 shows the subject invention. The chamber 10 is composed of an upper cylindrical section 11 and a lower integral frusto-conical section 12. In the best mode operation the chamber 10 contains approximately 50 bushels of feed mixture. The chamber 10 has a removable top small section 13 for checking and safety purposes. Attached to the chamber 10 are two hangers 14 useful when moving the subject invention off and on its moveable base 21, and this design is particular appropriate if standard cone holders to move large round hay bales can hook into these hangers. Alternatively if a forklift is employed, then lower lifting placements, not shown, are employed.

A necessary structural flame 20 supports the chamber 10 in a fixed vertical position on the moveable base 21, such as a pickup bed or a trailer pulled by a tractor. The vertical auger assembly 30 mounts centrally in the chamber 10 moving feed from the bottom to the top. The auger 31 is composed of a drive shaft 32, a flighting 33 attached to the drive shaft 32, and a tube housing 34. An upper bearing 35 attaches to the top of the chamber 10. Also at the upper end a bar slinger 37 is structurally positioned on the auger shaft to insure the mixed feed moves toward the outer chamber wall. At the lower end an appropriate chain-drive 36 is utilized to couple with its powering hydraulic motor 40, which has inlet 41 and outlet 42 fluid lines of the standard quick connect type. The complete lines including connectors and standard control boxes are not shown.

The feed material comes into the chamber 10 through an inlet opening 50 in the vertical auger 31 housing supplied by a horizontal auger 51 having a feed hopper 52 positioned to allow easy feeding of the various grains, supplements, and other feed ingredients. This auger 51 has standard components including an appropriate chain-drive to a hydraulic motor 53. The standard fluid connections are not shown.

The mixed feed leaves the chamber 10 through an exit opening 60 in the vertical auger 31 housing and supplies an auger 61 capable of removing this mixed feed. This auger 61 has the standard components including being chain-driven by a hydraulic motor 62, for which the standard fluid connections are not shown. To transfer the mixed feed into feedlot troughs for livestock, a multitude of potential extensions from the discharge of the leaving auger 61 are employable, and shown is a short rotatable section 63.

In the best mode the hydraulic fluid lines are connected serially between the vertical auger motor and the horizontal auger motor to minimize feed jams. This type of hydraulic connection is standard and therefore its details are not shown in FIG. 1.

The hydraulic motors employed are run with high pressures of approximately 1500 pounds per square inch (PSI) and are capable of approximately eight horsepower (HP). The hydraulic motors utilized in the best mode are those of Parker® or equivalent. Specifications are as follows:

Parker part number: MG041313AAAB; Rating: 2300 PSI maximum, 1800 PSI continuous, 879 inch-pounds maximum torque, 13.8 BP maximum; Factory location: Route 3, Box 112, Grantsburg, Wis. 54840.

As is common with commercial hydraulic motors, the hydraulic fluid lines, composed of one inlet and one outlet line, contain quick disconnects to make hooking and unhooking them an easy task once the pressure is released. A common operating variable is to throttle down such motors if feed load requirements do not require that much power, and this is performed by a standard commercial hydraulic control box inserted between the PTO and the particular hydraulic motor.

The subject invention employs three identical hydraulic motors for convenience, and the chamber vertical assembly auger motor and the inlet auger are commonly run at best mode conditions, while the discharge auger is commonly throttled down.

An important best mode design is that the inlet auger and the mixer auger have serial hydraulic motors so that they both run simultaneously. This operating restriction minimizes feed pileups or jams between the exit of the inlet auger and the beginning flight of the vertical mixing auger and keeps the high performance of the livestock mixer and feeder working at prudent efficiency.

The three augers are not commonly bought assembled since their length is specific to the size of the mixer chamber. Each is designed similarly with a housing of steel pipe of schedule 40, and commercial flighting obtained in standard form and of proper length. Standard flighting means the pitch between auger turns is the same as the diameter of the flighting. In the case of the best mode vertical mixing auger, this is a standard 11-inch flighting placed within a 12-inch inside diameter housing. This ½ inch slack between the edge of the flighting and the housing is necessary to prevent material jams and other bottlenecks under these severe and high RPM operating conditions. In the general design case this fighting clearance is a minimum of four percent based upon the inside diameter of the auger housing. To complete the auger design a flight-shaft bearing is placed upon one end and a drive arrangement on the other end. Because of its location in dirty, dusty conditions, this often is a chain drive connected to the hydraulic motor with an idler pulley to maintain tightness and to provide for easy removal.

In the best mode the two smaller augers are constructed from 8-inch steel pipe housing and 7-inch standard flighting; however, their particular length depends upon the details of the supporting vertical frame and the space available on the moveable base.

The vertical mixing auger housing is modified at its extremes since at the lower end it must have space for material coming from the inlet auger and also space for recycled feed being gravity fed back into the mixer auger. This later space is commonly positioned below a discharge hole in the conical chamber wall having a sliding covering plate that allows mixed feed into the discharge auger. If the plate is closed, recycling of the mixing occurs; if the plate is opened, the considerable mixed feed leaves the chamber through the discharge auger. At the top of the vertical mixing auger, its housing ends and structural supports connect the housing to the chamber top cover leaving room for the overflow of the uplifting material. In the best mode bar slingers are positioned on this exposed shaft to insure that considerable feed moves toward the outside wall of the chamber.

Feed material mixing and feeding apparatus comprising a vertical frame capable of placement upon a moveable base, and this frame is structurally sufficient to support the fully loaded chamber. This moveable base is often a pickup bed, but a farm tractor-trailer is employable. The chamber consists of an upper cylindrical section and an integral frusto-conical shaped lower section converging inwardly, wherein said chamber is capable of holding a minimum of 25 bushels. The chamber shape is shown in FIG. 1 discussed above. In the best mode his chamber holds approximately 50 bushes producing an apparatus weighing near 1000 pounds. This frame contains sufficient connectors allow easy loading and unloading using power equipment. The best mode employs connectors designed to hold the cones utilized by power equipment when moving large, round bales. The tractor or pickup commonly has provision for such PTO hay bale movement in a feedlot environment.

The means for moving said material into said chamber at a lower inlet opening including a feed hopper, and means for moving said material from said chamber through a lower exit opening are normally hydraulic motors running augers complete with control mechanisms powered by the system PTO. In an alternate configuration, electrical motors are employable particularly of the DC type allowing good speed control. Each of these motors develops a minimum of one horsepower. In the best mode where all hydraulic motors are identical, these operate at approximately three horsepower and so are throttled down from maximum PTO conditions. Depending upon the feeding requirement for the feedlot, a directing tube as a form of feedlot feeding arrangement is attached to the exit auger opening to allow easy placing of the mixed feed into livestock troughs while the pickup moves along.

The one or more assemblies comprise a vertical auger transferring said material from said inlet opening upward to a discharge near said cylindrical section top, wherein said assembly auger operates with a speed and flighting to obtain a minimum requirement of moving five bushels per minute. In the best mode this discharge is symmetrical via a common material slinger attached to the auger shaft extension. Whether it is a hydraulic or electrical motor, the power for this assembly must meet this minimum requirement and be complete with standard control aspects. In the best mode where the chamber holds approximately 50 bushels this assembly auger operates at approximately 20 bushes per minute using nearly eight horsepower. In the case of a very large chamber more than one vertical auger assembly are employable especially to keep the mixing time within reason; yet, in this alternate configuration each vertical auger is likely of smaller size than the previous single assembly.

The foregoing description of the specific embodiments will so fully reveal the general nature of the invention that others can, by applying current knowledge, readily modify and/or adapt for various applications such specific embodiments without departing from generic concept, and therefore such adaptations or modifications are intended to be comprehended within the meaning and range of equivalents of the disclosed embodiments. It is to be understood that the phraseology or terminology herein is for the purpose of description and not of limitation.

What is claimed is:

1. Feed material mixing and feeding apparatus, designed with limitations to efficiently match the available and required power to produce an effective portable system for modest sized feedlots, comprising:

vertical frame capable of placement upon a moveable base a chamber, supported by said frame, consisting of an upper cylindrical section and an integral frusto-conical shaped lower section converging inwardly, wherein said chamber is capable of holding a minimum of 25 bushels;

means for moving said material into said chamber at a lower inlet opening including a feed hopper;

means for moving said material from said chamber through a lower exit opening; and at least one assembly comprising a vertical auger transferring said material from said inlet opening upward to a discharge near said cylindrical section top, wherein said assembly auger operates with a speed and fighting to obtain a minimum requirement of moving five bushels per minute.

2. The apparatus according to claim 1 wherein said means for moving said material further comprises one or more hydraulic motors each capable of producing a minimum of one horsepower.

3. The apparatus according to claim 1 wherein said assembly further comprises a hydraulic motor capable of meeting said minimum requirement.

4. The apparatus according to claim 1 wherein said vertical frame further comprises connectors allowing power loading and unloading from said movable base.

5. The apparatus according to claim 1 wherein said lower exit opening further comprises means for feedlot feeding.

6. The apparatus according to claim 1 wherein said means for moving said material further comprises one or more variable-speed electric motors each capable of producing a minimum of one horsepower.

7. The apparatus according to claim 1 wherein said assembly further comprises a variable-speed electric motor capable of meeting said minimum requirement.

8. Feed material mixing and feeding apparatus, designed with limitations to efficiently match the available and required power to produce an effective portable system for modest sized feedlots, comprising:

a vertical frame capable of placement upon an appropriate pickup bed;

a chamber, supported by said frame, consisting of an upper cylindrical section and an integral frusto-conical shaped lower section converging inwardly, wherein said chamber is capable of holding a minimum of 25 bushels;

a substantially horizontal auger, attached to said chamber, capable of moving said feed into said chamber at a lower inlet opening from an attached feed hopper, wherein said horizontal auger is powered by a hydraulic motor capable of a minimum of one horsepower;

an auger, attached to said chamber, capable of moving said grain from said chamber through a lower exit opening and into a feedlot feeding arrangement, wherein said auger is powered by a hydraulic motor capable of a minimum of one horse-power; and at least one assembly comprising a vertical auger transferring said material from said inlet opening upward to a discharge near said upper cylindrical section top, wherein said assemble auger operates with a speed and fighting to obtain a minimum requirement of moving five bushels per minute, and wherein said assembly is powered by a hydraulic motor capable of meeting said minimum requirement.

9. The apparatus according to claim 8 wherein said hydraulic motor for said horizontal auger further comprises a serial hydraulic connection to said hydraulic motor for said assembly.

10. The apparatus according to claim 8 wherein said lower section of said chamber has a height approximately twice that of said upper section.

11. The apparatus according to claim 8 wherein all said augers further comprise a flighting design allowing a minimum of four percent rotating clearance based upon said auger inside housing diameter.

12. The apparatus according to claim 8 wherein said vertical frame further comprises connectors allowing power loading and unloading from said pickup.

13. The apparatus according to claim 8 wherein all said hydraulic motors further comprise being powered by a controlled hydraulic power takeoff integral to said pickup.

* * * * *